Feb. 6, 1934.    A. JOHNSON    1,945,813
COMBINATION HAND AND AIR GREASE GUN
Filed April 2, 1932
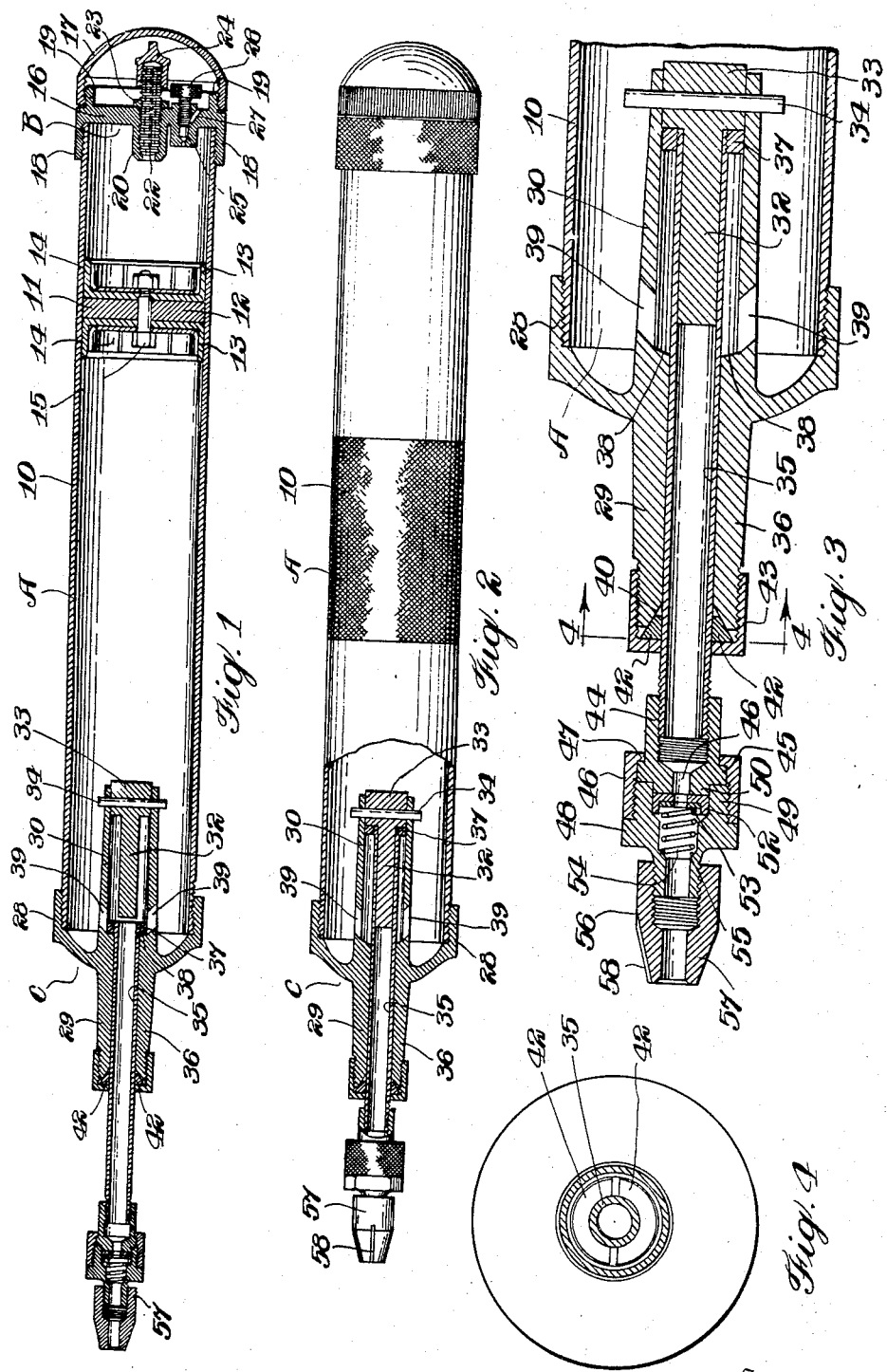
Inventor
August Johnson
By Howard Fischer
Attorney Patented Feb. 6, 1934

1,945,813

UNITED STATES PATENT OFFICE 1,945,813

COMBINATION HAND AND AIR GREASE GUN

August Johnson, Fargo, N. Dak., assignor to Jiffy Lubricator Company, Inc., Fargo, N. Dak., a corporation of North Dakota Application April 2, 1932. Serial No. 602,762

13 Claims. (Cl. 221—47.4)

My invention relates to an improvement in combination hand and air grease gun of a type particularly adapted for the dispensing of heavy grease. This gun is designed for the lubrication of water pumps, universal joints, steering gears, front wheel bearings on automobiles, tractors or trucks, or any other devices where heavy grease is desired for use.

It is a primary object of my invention to provide a grease gun having a cylinder or tube which contains the grease and in which a piston is floated, which is adapted to force the grease within the cylinder or tube into discharge or feeding position by air pressure. In this way the handling of the grease may be controlled and operated manually and the feeding may be done by air pressure.

It is a feature of my invention that the gun is self-contained as a unit and carries a pneumatic pressure storage within the body of the gun itself back of the operating or floating piston. The gun is filled by pushing the piston to the rear end of the cylinder or tube from which the air pressure has been released, and inserting the grease in the cylinder or tube in the front end thereof forward of the piston. The front end of the cylinder containing the valve mechanism and the grease nozzle is then secured in place, and air is injected into the cylinder back of the operating piston. From forty to a hundred pounds of air pressure, or any other desirable pressure is injected into the cylinder to the rear of the operating piston. A cap is then secured on the rear end of the gun to protect the air valve and to form a working end which is adapted to bear against the palm of the operator's hand in using the gun, to force the grease out of the ejecting end or nozzle opening at the forward end of the gun.

It is a feature of my invention to provide a nozzle connection at the front end of the gun which is suited to accommodate any desired type of nozzle fitting. By this means, any desired type of nozzle fitting may be employed to accommodate the particular type of fitting with which the gun is adapted to be used.

It is an added feature of my invention to provide a groove in the nozzle to provide an indication that the part being greased is full. This groove extends into close proximity with the fitting against which the nozzle is being forced and when the passage of the lubricant is blocked, a small amount of the same will force its way into the groove, indicating to the operator that no more grease can be ejected at this time.

It is an added purpose of my invention to provide a means of easily closing the passage from the grease chamber to the nozzle of the gun. This is accomplished by providing an inwardly extending sleeve on the front end of the cylinder forming the gun body. This sleeve is closed at the end but is provided with apertures spaced from the inner end through which the grease may pass. A slidable tubular member is positioned within the inwardly projecting sleeve, which when in one extreme position opens the apertures leading into the sleeve and when in any other position, closes these apertures. A nozzle is situated on the outer end of this tubular member. Thus, when the tubular member is in one extreme position, the piston forces the grease through the apertures into the sleeve and acts to fill the tubular member. The tubular member is then slid inwardly to close the apertures. Simultaneously, however, a plunger is forced into the tubular member, forcing the lubricant out through the nozzle. Accordingly, while the lubricant is fed into the tubular member into position to be used by air pressure, the actual forcing of the lubricant into the grease fitting is accomplished by manually forcing the tubular member into the inwardly extending sleeve.

It is a purpose of my invention to provide a locking means for holding the tubular member in any desired position. This locking means consists of a split beveled ring which may be forced into contact with the tubular member by the tightening of a screw cap, which forces the beveled split washer against a beveled seat. The gun may in this way be locked in closed or open position.

These and other details, objects and novel features of my invention will be more clearly and fully set forth in the following specification and claims.

In the drawing forming a part of this specification:

Figure 1 is a longitudinal cross sectional view centrally through the grease gun.

Figure 2 illustrates a side elevation view, partly in cross section of the grease gun, illustrating the nozzle and pumping mechanism in a different relative position from that illustrated in Figure 1.

Figure 3 is an enlarged sectional view of the forward end of the grease gun, illustrating the parts thereof in detail.

Figure 4 is a cross sectional view on the line 4—4 of Figure 3.

The grease gun A is formed with a tubular or cylindrical body portion 10, having a rear end closure B and a front closure member C. A floating piston 11 is inclosed within the cylinder 10. The piston 11 in preferred form is formed of a central stiffening member of brass or other suitable material 12, having a cup-shaped washer 13 oppositely disposed on either side thereof. Metal reinforcing washers 14 fit within the leather washers 13 and the entire piston is held together by means of a suitable bolt 15.

The rear end closure B is formed of an inner closure member 16 and an outer cap 17. The inner closure member 16 is equipped with a tubular flange 18 which is internally threaded to fit complementary threads on the end of the cylinder 10. A second tubular flange 19 of slightly smaller diameter is externally threaded to fit internal threads on the cap 17. The inner closure 16 is provided with a central boss 20, threaded to accommodate the air valve 22. A lock nut 23 holds the valve 22 in place and a conventional type of air valve cap 24 is provided for the outwardly projecting end of the air valve 22. A boss 25 is also provided in the closure 16 for accommodation of the air release screw 26. When the air release screw 26 is loosened, a passage 27 is opened from the inside of the cylinder to permit air pressure therein to be released.

The front end closure C supports the lubricant feeding mechanism and the valve and nozzle mechanism. The front closure C comprises a screw cap 28 adapted to be threaded to the forward end of the cylinder 10 and an integral sleeve 29, which extends some distance into the cylinder 10 and which projects forwardly from the screw cap 28. The inwardly projecting portion 30 of the sleeve 29 is provided with an enlarged bore and is equipped with a plunger rod 32 extending forwardly from the inner end of the sleeve 29. The plunger rod 32 is provided with an enlarged head 33, which fits tightly into the extreme end of the inner portion 30 of the sleeve 29, and is held in this position by means of a pin 34. The head 33 of the plunger rod 32 entirely closes off the inward end of the sleeve 29. The plunger 32 is centrally positioned and is of proper size to snugly fit within a hollow tube 35 which extends through the outwardly extending portion 36 of the sleeve 29.

The hollow tube 35 is of proper diameter to fit snugly within the outwardly extending portion of the sleeve 29, and is externally threaded at its inner extremity to accommodate a collar 37. The collar 37 is of proper outer diameter to fit loosely within the enlarged bore of the inwardly extending end 30 of the sleeve 29. Accordingly, when the plunger rod 32 is in position within the inwardly extending portion 30 of the sleeve, the sliding movement of the hollow tube 35 is restricted by the collar 37 in its movement, this collar striking the head 33 of the plunger piston 32 at one extremity of its stroke, and striking a shoulder 38 formed by the reduction of diameter of the bore in the forwardly projecting portion of the sleeve 29 at the other end of its stroke. Apertures 39 are formed in the sleeve 29 near the base of the inwardly extending portion 30 of the sleeve, through which grease may pass from within the cylinder 10 into the sleeve 29 and into the hollow tube 35, when this tube is in the position illustrated in Figure 1 in extended position. It may be seen that when the hollow tube is in the position illustrated in Figure 1, the plunger rod 32 is entirely withdrawn from the hollow tube 35, and the collar 37 has passed a large portion of each aperture 39 forming a direct passage from the cylinder 10 through the apertures 39 into the inwardly projecting portion 30 of the sleeve 29, between the end of the plunger rod 32 and the hollow tube 35, and into the tube 35. Accordingly, when the tube 35 is in the extended position illustrated, grease may be forced into the tube 35 and the nozzle mechanism.

The contracted position of the tube 35 is illustrated in Figures 2 and 3 of the drawing. In this position, the tube 35 is forced into the sleeve 29 until the collar 37 strikes the head 33 of the plunger rod 32. When in this position, there is no passage between the nozzle and the interior of the cylinder 10. The collar 37 prevents lubricant from passing through the apertures 39, from entering the end of the tube 35 and furthermore, the end of the tube 35 is blocked off by means of the plunger 32. The tube 35 fits sufficiently tight in the outwardly projecting end 36 of the sleeve 29 to prevent the heavy grease from escaping therebetween. The collar 37 fits within the inwardly extending portion 30 loosely enough to permit any grease in this portion to escape as the collar 37 moves toward the head 33.

The outer end of the outwardly projecting portion 36 of the sleeve 29 is inwardly tapered or beveled to provide a beveled surface 40 against which the beveled split washer members 42 may bear. The screw cap 43 is adapted to bear against the split beveled washer 42 to force the same against the beveled surface 40 on the sleeve 29. It may thus be seen that as the screw cap 43 is tightened against the split washer 42, the washer 42 will be contracted against the tube 35, locking the tube against movement. Thus, by merely tightening the screw cap 43, the tube 35 may be locked in either extreme position or in any intermediate position.

A swivel joint is secured to the end of the tube 35. This swivel joint consists of a sleeve 44, which is internally threaded to screw onto the outer end of the tube 35. The sleeve 44 is provided with a circumferential flange 45. A restricted opening 44' is provided at the outer end of the sleeve 44. A sleeve 46 provided with an inwardly projecting flange 47 at one end thereof, fits over the circumferential flange 45 of the sleeve 44. The flange 47 fits snugly over the sleeve 44 and the sleeve 46 fits snugly over the flange 45, these flanges interlocking to provide a tight rotatable joint. The sleeve 46 is internally threaded to fit the nut member 48 which extends within the sleeve 46 and fits closely adjacent the sleeve 44. The nut member 48 is hollow and is provided with an inwardly extending end portion 49, having a bore of proper size to accommodate the cylindrical end 50 of the sleeve 44 and the leather washer 52. The leather washer 52 is cup-shaped and is reinforced by a metal washer 53. A coil spring 54 is interposed between the washer 53 of the leather washer 52 and a shoulder 55 within the nut member 48 formed by restricting the diameter of the bore somewhat. The spring 54 holds the leather washer 52 against the end 50 of the sleeve 44 at all times, providing a tight connection between these parts. The nut 48 is provided with a tubular end 56, which is externally threaded to accommodate the nozzle 57.

The nozzle 57 may be of any suitable type to fit any sort of grease fitting with which the gun A is to be used. The gun A may be provided with a number of nozzles 57 of different types to fit different forms of grease fittings and may be easily interchanged when desired. In the nozzle illustrated in the drawings, I have provided a groove 58 to serve as an indication that the particular fitting being greased is filled. The groove 58 extends to a point at the end of the nozzle very close to the fitting, so that when the force of the grease separates the nozzle from the fitting very slightly, grease will be forced through the groove 58, and the operator will be informed that the particular fitting being greased is filled.

In the operation of my grease gun A, the cap 17 is removed and the pressure release screw 26 unscrewed. The front closure C is then unscrewed as a unit from the cylinder 10 and the piston 11 may then be forced to the rear of the cylinder, the air from behind the piston being permitted to escape through the passage 27 of the air release. Grease may then be placed in the cylinder 10 forwardly of the piston 11 through the open forward end formed by the removal of the front closure C. When the cylinder 10 is filled with grease, the closure C is replaced on the cylinder 10. The pressure release screw 26 is then tightened to close the passage 27, the cap 24 of the air valve 22 is removed, and air pressure is injected into the cylinder 10 in the space between the piston 11 and the inner closure 16 of the rear end closure B. Any desired pressure may be injected into the cylinder 10, depending upon the type of lubricant used and the work to be accomplished. When the air pressure is being injected into the cylinder 10, the tube 35 is preferably in contracted position as is illustrated in Figure 2 of the drawing, being held in this position by the tightening of the cap 43. When the proper air pressure has been injected, the cap 17 may be replaced and the gun A is in readiness for operation.

In using the grease gun A, the screw cap 43 is loosened to unlock the tube 35 and to permit the same to slide longitudinally. The tube 35 is then pulled into the extended position illustrated in Figure 1. The air pressure to the rear of the piston 11 forces the lubricant under pressure through the apertures 39 into the inside of the inwardly projecting portion 30 of the sleeve 29, and into the tube 35, filling this tube. The nozzle 57 is placed against the fitting to be greased and pressure is exerted upon the cap 17 to force the tube 35 into the contracted position illustrated in Figure 2. As the tube 35 moves inwardly in the sleeve 29, the plunger rod 32 projects into the tube 35, forcing the lubricant contained therein out through the nozzle 57. When the contracted position illustrated in Figure 2 has been reached, the cylinder 10 is pulled outwardly away from the nozzle 57 into the position illustrated in Figure 1 and the tube 35 may be filled with grease. This process may be repeated until the grease within the cylinder 10 has been expelled.

I have found my combination hand and air grease gun very efficient for use with heavy greases and the like. My grease gun is very simple to operate and is contained in a unit, necessitating no air hose connections in order to provide a means for forcing the lubricant into the fitting. My grease gun A can be controlled and operated manually, the pressure being released whenever desired by merely ceasing the manual operation. The air compression chamber acts to force the lubricant into feeding position quickly and efficiently.

In accordance with the patent statutes, I have described the principles of operation of my hand and air operated grease gun and while I have endeavored to set forth the best embodiment thereof, I desire to have it understood that this is only illustrative of a means of carrying out my invention and that obvious changes may be made within the scope of the following claims without departing from the spirit of the invention.

I claim:

1. A hand and air grease gun including, a grease supply cylinder, a floating piston operable in said cylinder to force the grease out of said gun, a pneumatic compartment on one side of said piston, an ejecting nozzle extending from said grease compartment, a slidable tubular support for said nozzle, means for locking said tubular support against sliding movement, grease passageways leading to said tubular support, and a fixed rod adapted to extend into said tubular support to close the same when said tubular support is in innermost position.

2. A grease gun including, a grease cylinder, a floating piston in said cylinder, a pneumatic chamber on one side of said piston, a valve to said pneumatic chamber to permit air to be injected from an air hose, and a slidable grease ejecting end on said grease chamber having means for locking said slidable end against movement in one extreme position.

3. A grease gun including, a dispensing nozzle, a grease compartment for holding a supply of grease, a floating piston in said compartment, a pneumatic chamber for receiving a charge of compressed air on one side of said piston having an air receiving valve, a movable grease ejecting end, and means for locking said end against movement.

4. A grease gun including, a grease supply chamber, a piston in said chamber, a pneumatic chamber on one side of said piston having an air receiving valve, said pneumatic chamber being adapted to receive air pressure to force said piston against the grease in the grease supply chamber, a grease dispensing nozzle end having a tubular nature, means for closing said nozzle end to stop the flow of grease from the grease chamber caused by the pneumatic pressure against said piston and means for locking said closing means in any position.

5. A grease gun including, a tubular body portion adapted to provide a supply chamber for lubricating grease, a piston in said chamber having packing means on either side thereof, a pneumatic chamber on one side of said piston, and a grease chamber on the other side thereof, an air valve in one end of said body, an air release valve adjacent said air receiving valve, a closure cap for covering said valves and providing a smooth hand bearing on the end of said body portion, and a closable adjustable nozzle end formed on the other end of said body portion.

6. A grease gun including, a tubular body portion, a floating piston in said body portion adapted to divide the inner chamber thereof to form a pneumatic chamber on one side and a grease receiving chamber on the other side of said piston, an air receiving valve in one end of said body portion, an air release valve adjacent said air receiving valve, a cap for covering said valves, a tubular support formed on the other end of said body portion having a tubular portion projecting into the grease chamber, a grease driving rod positioned in said tubular support, a nozzle supporting grease dispensing tube slidably supported in said tubular support with said rod positioned to enter one end thereof, and a locking collar extending about said slidable tube to lock the same in closed position.

7. A nozzle end for a grease gun including, a slidable tubular nozzle supporting sleeve, a grease nozzle supported on the outer end thereof, a collar secured to the inner end of said tubular sleeve, a tubular supporting member in which said sleeve is adapted to axially slide, a locking collar extending about said sleeve adapted to lock said sleeve in closed position, a grease driving rod fixed in said tubular support for said sleeve in a manner to close said sleeve when the same is positioned inwardly over said rod and to open said sleeve when withdrawn off of said rod.

8. A grease gun including, a tubular body portion, a floating piston in said body portion adapted to divide the same into a grease compartment on one side and a pneumatic chamber on the other side, an air receiving valve to the pneumatic chamber, a cap for covering said valve, a slidable tubular nozzle supporting sleeve in direct communication with said grease compartment when in open position positioned on the forward end of said gun, and a grease ejector rod adapted to operate into and out of said sleeve to close the same and to assist in forcing grease out of said sleeve through the dispensing nozzle.

9. A grease gun comprising a tubular body portion for receiving a supply of grease, a piston for urging the grease out of said body portion, a pneumatic chamber having an air receiving valve to provide a pneumatic storage chamber the pressure of which is to operate said piston to eject the grease from said gun, and a grease dispensing sleeve in direct communication with said grease chamber in open position and grease ejecting rod closing said sleeve in closed position supported on said grease chamber.

10. A unitary self-contained pneumatic grease gun including, a tubular body, a floating piston in said body adapted to provide a grease compartment on one side, and a pneumatic storage chamber on the other side, an air receiving check valve to said pneumatic chamber, a cap for covering said valve, and a grease dispensing nozzle supporting end carried by said body, said dispensing end including a slidable sleeve, means for locking the sleeve against sliding, and a grease ram-rod operable in said sleeve.

11. A unitary portable pneumatic grease gun including, a grease chamber, a floating piston in said grease chamber providing a pneumatic compartment to contain air under pressure on one side and a grease chamber on the other side thereof, a slidable grease dispensing tube extending from the grease chamber into which grease is forced by said piston by air pressure in said pneumatic chamber, and means for closing said dispensing tube when said tube is forced inwardly.

12. A unitary portable pneumatic grease gun including, a pneumatic storage chamber adapted to be filled with a source of air pressure, a piston operated by the pneumatic pressure, a grease chamber on one side of said piston, a grease dispensing tube, and a longitudinally extending grease ram-rod adapted to operate with said tube, whereby the operator of said gun may urge grease out of said tube by said ram-rod with longitudinal hand operated force after said tube has been filled with grease by the pneumatic pressure against said piston.

13. A unitary self-contained pneumatic grease gun including, a tubular body, a floating piston in said body adapted to provide a grease compartment on one side, and a pneumatic storage chamber on the other side, an air receiving check valve to said pneumatic chamber, and a grease dispensing nozzle supporting end carried by said body, said dispensing end including a slidable sleeve, means for locking the sleeve against sliding, and a grease ram rod operable in said sleeve.

AUGUST JOHNSON.